United States Patent

Koerner

[15] 3,649,958

[45] Mar. 14, 1972

[54] VEHICLE DETECTION SYSTEM

[72] Inventor: Ralph J. Koerner, Canoga Park, Calif.

[73] Assignee: Canoga Controls Corporation, Canoga Park, Calif.

[22] Filed: Mar. 25, 1970

[21] Appl. No.: 22,555

[52] U.S. Cl. ..........................................340/38 L
[51] Int. Cl. .............................................G08g 1/00
[58] Field of Search ........................340/38 L, 310

[56] References Cited

UNITED STATES PATENTS

| | | | |
|---|---|---|---|
| 3,249,915 | 3/1966 | Koerner | 340/38 L |
| 1,992,214 | 2/1935 | Katz | 340/38 L |
| 2,663,867 | 12/1953 | Favara | 340/310 |

Primary Examiner—Ralph D. Blakeslee
Attorney—Samuel Lindenberg and Arthur Freilich

[57] ABSTRACT

A system useful in service stations and the like for indicating the entry of a vehicle onto a specified area of the earth's surface. The system includes a magnetic field sensor which yields an output signal indicative of the magnetic field intensity thereat. The sensor is mounted adjacent to but outside of a volume being monitored which constitutes the projection of the specified area in the direction of the magnetic field thereat. When the magnetically permeable mass of a vehicle enters the volume being monitored, it increases magnetic field intensity therein but reduces the field intensity outside of this volume. The reduction in field intensity is recognized by the sensor which then energizes an indicating device such as a remote bell. The sensor preferably comprises a flux gate magnetometer which is excited by a high frequency signal supplied by an oscillator. This signal can be coupled to the existing service station power line to energize the remotely located bell, also coupled to the power line.

24 Claims, 11 Drawing Figures

INVENTOR.
RALPH J. KOERNER

BELL UNIT

*INVENTOR.*
RALPH J. KOERNER

BY Lindenberg, Freilich & Wasserman

ATTORNEYS

VEHICLE DETECTION SYSTEM

BACKGROUND OF THE INVENTION

This invention relates generally to systems for detecting vehicles and is particularly useful, for example, in service stations and the like to indicate the entry of a vehicle into a specified area.

Most modern service stations are equipped with some type of system for detecting the entry of a vehicle into a specified service area, usually adjacent the gasoline dispensers, and for remotely indicating the vehicle's arrival, as by ringing a bell within the service station house. The most prevalent system by far for performing this task utilizes an inexpensive pneumatic hose which is layed on the ground in the specified area and which is directly coupled to a bell unit within the house. The tires of an arriving vehicle travel over and pinch the hose to couple a pneumatic pulse to the bell to close a pair of contacts to in turn energize a striker solenoid. Although such pneumatic systems are relatively inexpensive to install, their disadvantages have long been recognized. For example only, they present a very real pedestrian hazard, must be periodically replaced, and often malfunction as a consequence of filling with water. In view of these and other disadvantages, many underground systems have been proposed and utilized. One such early system utilized a photodetector buried under the service area which looked upwardly through a transparent window. When a vehicle arrived, it rapidly reduced the light to the detector to trigger actuation of the bell. As might be expected, however, such a system proved to be unreliable due primarily to dirt collecting on the window, pedestrians walking over it, etc.

Other underground detection systems have operated in response to the magnetic characteristics of a vehicle. More particularly, in one such system, a large multiturn wire coil is buried beneath the surface around the entire area to be monitored and is connected to the bell unit within the service station house. As a vehicle enters the area, it varies the intensity of the earth's magnetic field and as a consequence induces an electromotive force (EMF) in the wire related to the rate of change of flux, which EMF actuates the striker solenoid.

Still other systems have employed magnetometer probes buried under the surface within the service area to be monitored and connected to the bell unit within the service station house. The magnetometer probes provide an output signal related to magnetic field intensity through an effective sampling area thereof. As a consequence, each magnetometer probe is able to detect a vehicle passing thereover by sensing the increase in magnetic field intensity produced by the vehicle. A field intensity increase produces a variation in the magnetometer output signal to in turn actuate the striker solenoid. A magnetometer system which can be used in this manner is disclosed in U.S. Pat. No. 3,249,915 issued to Ralph J. Koerner.

Although the buried coil and magnetometer systems generally function satisfactorily to detect and indicate the arrival of a vehicle, they are generally quite expensive to install because they require that the concrete service areas or surrounding blacktop areas or both be extensively saw cut. In the case of the coil, a single coil is usually buried around an entire service area concrete pad which may encompass two service islands and be on the order of 30×60 feet, thus requiring a saw cut of over 180 linear feet. In the case of the conventional magnetometer probe system, one or more probes is buried in the service area pad on each side of a service island. A somewhat shorter total saw cut length is normally required for the buried magnetometer system as compared to the buried coil system, but the greater cost of the magnetometer probes as compared to the wire, often causes the total cost of an installed buried magnetometer system to exceed that of a buried coil system.

SUMMARY OF THE INVENTION

An object of the present invention is to provide an improved system for detecting the entry of a vehicle into a specified area of the earth's surface.

The operation of known prior art magnetometer vehicle detector systems has been based upon the recognition that the magnetically permeable (permeability greater than unity) masses found in conventional vehicles, effectively collect and concentrate the earth's magnetic field lines (essentially vertical at the earth's surface at locations remote from the equator) therethrough to thus increase the magnetic field intensity above and below the vehicle as compared to the ambient magnetic field intensity in the absence of the vehicle. Thus, prior art systems, of which the system of U.S. Pat. No. 3,249,915 is exemplary, have utilized magnetometers displaced vertically, either above or below, from the specified area of the earth's surface being monitored but within a volume constituting a substantially vertical projection of the specified area. As is explained in the aforementioned U.S. Patent, although the earth's magnetic field can usually be considered as being essentially vertical at most significant locations on the earth's surface, it is seldom truly vertical, but rather exhibits a slight inclination or dip angle. Accordingly, use of the term "substantially vertical projection" herein should be understood to mean the projection of a specified area at essentially the inclination or dip angle of the magnetic field appropriate to the location of that area.

In accordance with one aspect of the present invention, magnetic field sensing devices such as flux gate magnetometers, are disposed adjacent to but outside of the volume formed by projecting the area to be monitored in the direction of the magnetic field to detect a reduction in magnetic field intensity caused by the entry of a vehicle into the monitored area. More particularly, instead of using a magnetometer to look for an increase in magnetic field intensity produced by a vehicle entering into a specified volume, in accordance with the present invention a magnetometer is used to look for a reduction in magnetic field intensity adjacent to but outside of that volume.

The significant advantages in detecting vehicles by sensing a reduced, rather than an increased, magnetic field intensity, is that a single magnetometer probe can be used to monitor two adjacent areas, that is, for example, areas on both sides of a service station island. Additionally, in accordance with the present invention, the magnetometer can be conveniently mounted above the surface at a height which would interfere with the vehicle if the magnetometer was mounted within the projection of the monitored area. By enabling the magnetometer probe to be mounted above the surface, for example on the gasoline dispenser housing in a service station, installation costs as compared with buried systems are reduced drastically.

In a preferred embodiment of the invention, for use in applications in service stations, for example, where it is desired to actuate an indicator such as a bell at a location remote from the sensor unit, a command or bell actuation signal is communicated to the bell unit over the existing service station 110 volt 60 hertz AC power line which is normally available at both the service station house and islands.

More particularly, in a preferred embodiment of the invention, flux gate magnetometers are utilized as the magnetic field sensors. The magnetometers are excited by an oscillator within the sensor unit at some frequency which is very high compared to 60 hertz; e.g., 100 K hertz. In response to the sensor unit detecting the entry of a vehicle into the monitored area, the oscillator output is gated onto the existing power line for a short interval. A bandpass filter at the bell unit responds to the oscillator output to actuate the striker solenoid.

In accordance with the present invention, a reduction in field intensity is sensed by comparing the magnetometer output signal with a reference signal corresponding to a threshold level of field intensity. In one embodiment of the invention, the threshold level is set based upon ambient conditions and then held constant. This embodiment enables the detection system to sense the continued presence of a vehicle within the monitored area, as well as the entry of the vehicle into the area. That is, as long as the vehicle is present within the monitored area, the field intensity measured by the magnetometer will be below ambient.

In accordance with another embodiment of the invention, the threshold level is caused to vary in response to the magnetometer output signal to thus enable the sensor unit to adapt to what can be considered a changed ambient level. In this adaptive embodiment, the entry of a vehicle to one side of a service station island will reduce the field intensity seen by the magnetometer on the island and will cause the threshold level to drift toward the reduced intensity level seen by the magnetometer. After a short time interval, e.g., 3 seconds, the threshold level will reach the reduced intensity level and the sensor unit will then be in condition to sense a further field reduction as would be produced by a vehicle entering the service area to the other side of the island.

Although embodiments of the present invention find particular utility in service station applications and the like, it is emphasized that the concept of sensing for a reduced magnetic field intensity outside of the substantially vertical projection of a monitored area finds significant utility in many other vehicle detection systems such as in conjunction with parking gates, toll collection gates, traffic actuation and counting systems, etc.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
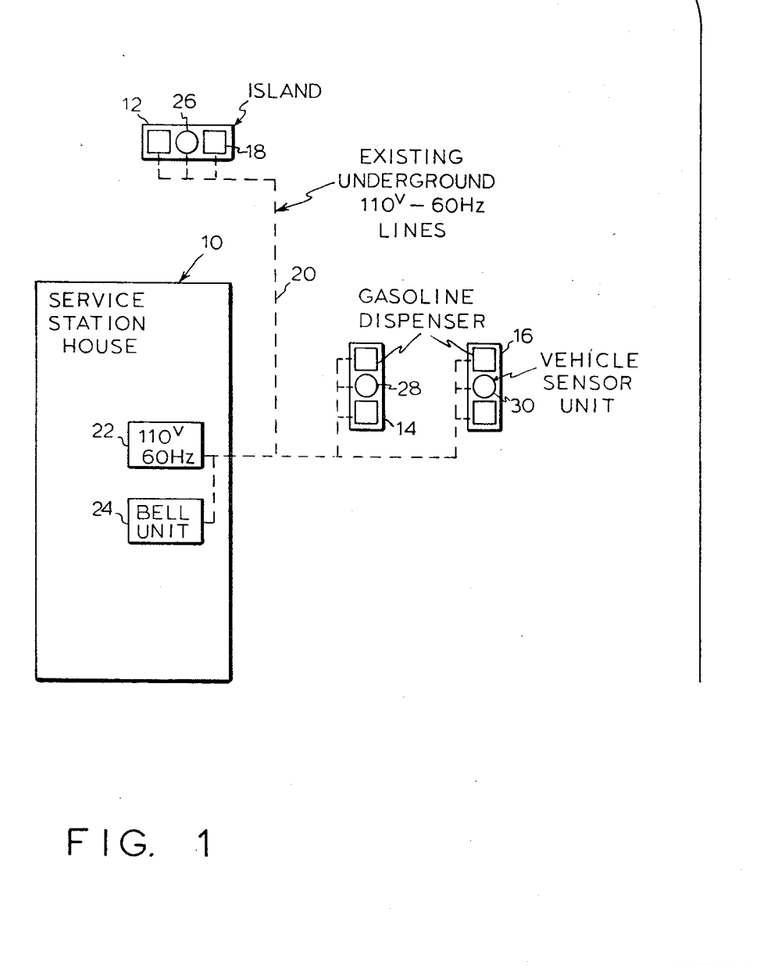
FIG. 1 is a schematic plan view of a typical service station.

Attention is now called to FIG. 1 of the drawings which illustrates a schematic plan view of a typical service station. The station of FIG. 1 includes a service station house 10 and three service islands 12, 14 and 16. Typically, each of the islands will have two or more gasoline dispensers 18. An underground 110 volt, 60 hertz alternating current power line 20 typically connects the electrical panel 22 at the house 10 to each of the service islands.

A bell unit 24 is normally mounted within the house 10 for audibly signaling when a vehicle enters a service area adjacent to one of the islands. As previously pointed out, typical prior art systems for detecting the entry of a vehicle have utilized pneumatic hoses laid on the ground, or photodetectors, wire coils, or magnetometer detectors, buried beneath the surface.

Regardless of the particular type of detection system employed, some means is, of course, provided for actuating the bell unit 24 in response to the detection of a vehicle entry.

In accordance with the present invention, a vehicle sensor unit, to be described hereinafter in detail, is mounted on each of the islands for detecting the entry of a vehicle into the service area on either side of the island. More particularly, a vehicle sensor unit 26 is mounted on the island 12 for detecting the entry of a vehicle into the service areas immediately north and south of the island 12. Similarly, a sensor unit 28 is mounted on the island 14 for detecting the entry of vehicles into the service areas immediately east and west of the island 14. Sensor unit 30 is mounted on the island 16 to detect the entry of a vehicle into the service areas immediately east and west of the island 16.

As will be better appreciated hereinafter, the sensor units are comprised of a magnetic field sensing device and associated electronic circuitry and can be housed within a very small container adapted to be mounted on any convenient structure such as, for example, the gasoline dispenser housings. FIG. 1 is intended to merely illustrate the vehicle sensor units as being located on the islands and being connected to the existing service station 110 volt, 60 hertz power line. As will be seen hereinafter, in accordance with the preferred embodiment of the present invention, each of the vehicle sensor units is electrically powered from the 110 volt, 60 hertz power line. In addition, each sensor unit, in response to detecting the entry of a vehicle into an adjacent service area, provides a high frequency command or bell actuation signal on the power line 20. This high frequency command signal is detected by the remote bell unit 24 in house 10 to actuate a striker solenoid therein. By utilizing the existing power lines 20 to communicate between the islands and the bell unit 24, installation costs as compared to existing detection systems are drastically reduced.

Figure 2A:
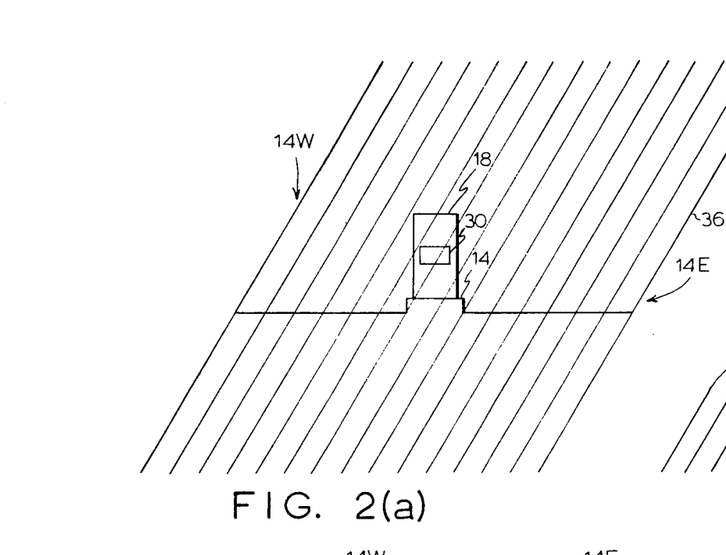
FIGS. 2A and 2B are diagrams schematically illustrating the substantially uniform ambient earth's magnetic field produced adjacent a service station island in the absence of a vehicle adjacent thereto.
Figure 2B:
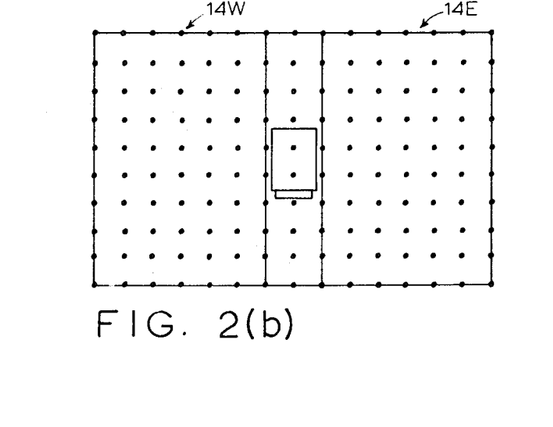

Attention is now called to FIGS. 1A and 2B which illustrate a representation of the ambient earth's magnetic field adjacent to one of the islands, e.g., island 14, of FIG. 1. FIG. 2 illustrates a single gasoline dispenser 18 situated on the island 14. The vehicle sensor unit 30 is illustrated as being mounted on the side of the gasoline dispenser housing.

FIGS. 2A and 2B illustrate lines 37 intended to represent the ambient earth's magnetic field in the absence of a vehicle or other magnetically permeable mass being present in the service areas 14W and 14E being present to the west and east, respectively of the island 14. As represented in FIGS. 2A and 2B, it will be noted that the ambient earth's magnetic field intensity is substantially uniform in the absence of a vehicle within the service area. It will be appreciated, of course, that steady state magnetic field distortions due to the permanent presence of magnetically permeable masses, such as the housing of the dispenser 18, have been ignored. The magnetic field lines 36 in FIGS. 2A and 2B have been illustrated as being slightly inclined with respect to the surface. Although the magnetic field can be considered as being substantially vertical with respect to the surface at most locations on the earth's surface displaced from the equator, in reality, the magnetic field lines at any particular location will be inclined at some angle usually referred to as the dip angle of the earth's magnetic field. For example, the dip angle in Los Angeles, California is approximately 60°.

The sensor unit 30, as will be explained in greater detail hereinafter, includes a magnetic field sensing device which provides an output signal having a characteristic related to the level of magnetic field intensity through a "sampling area" or "flux collecting aperture" thereof. As is explained in the afore-cited U.S. Pat. No. 3,249,915, magnetic field sensing devices generally may be regarded as having such a sampling area or flux collecting aperture, the size and shape of which are dependent upon the characteristics of the particular device. In the preferred embodiment of the present invention, the sensing device comprises a flux gate magnetometer whose sampling area is generally defined by the nature, size and shape of the magnetometer core structure and any additional flux collecting elements, if any, together with the coils surrounding the core structure.

Figure 3A:
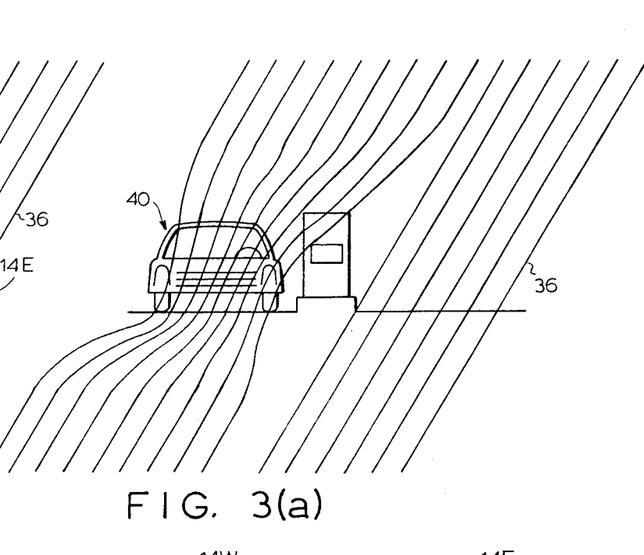
FIGS. 3A and 3B are schematic diagrams illustrating the manner in which a vehicle entering the area adjacent the island shown in FIGS. 2A and 2B distorts the ambient magnetic field.
Figure 3B:
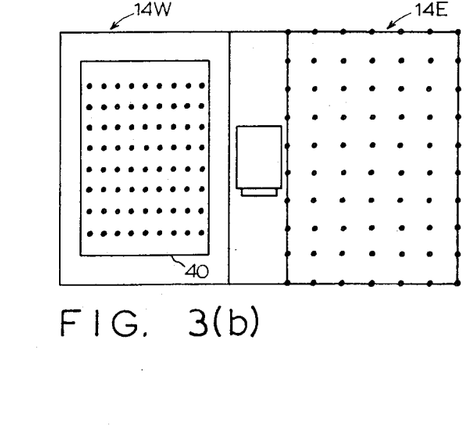

As shown in FIGS. 2 and 3, the sensing unit 30 is mounted between the projections of the service areas 14W and 14E projected in the direction of the magnetic field. The sensing device, i.e., the magnetometer, within the sensing unit is oriented so that its sampling area senses the substantially vertical external magnetic field component so as to thus enable it to indicate a reduction in that component from an ambient level caused by a vehicle entering one of the areas 14W or 14E.

More particularly, as has been recognized and explained in the afore-cited U.S. Pat. No. 3,249,915, a magnetically permeable mass, such as is found in conventional vehicles, will concentrate the magnetic field lines therethrough to thus increase magnetic field intensity above and below the vehicle. More accurately, it can be said that the presence of a magnetically permeable mass on a specified area of the earth's surface, such as service area 14W of FIGS. 2 and 3, will increase the magnetic field intensity within a volume constituting the projection of the specified area in a direction determined by the magnetic field inclination at that site. Whereas, prior art magnetometer detection systems have employed the recognition of this intensity increase phenomena in order to detect the presence of vehicles within a specified area, in accordance with the present invention the magnetic field sensing means is disposed so as to sense magnetic field intensity outside of the volume in which the field intensity is increased as a consequence of the vehicle presence. That is, as shown in FIGS. 2 and 3, the sensor unit 30 is mounted so as to be adjacent to but outside of the volumes constituting the substantially vertical projections of the specified service areas 14W and 14E. Consequently, when the vehicle 40 enters the area 14W, it substantially increases the field intensity as represented in FIGS. 3A and 3B above and below the vehicle within the projection of the area 14W in the direction of the magnetic field. However, as will also be noted in FIGS. 3A and 3B in the presence of the vehicle 40, the field intensity is reduced from ambient adjacent to but outside of the projection of the area being monitored. Thus, the magnetic field intensity at the sensor unit 30 in the presence of the vehicle 40 as shown in FIG. 3 is reduced from the ambient field intensity level as shown in FIG. 2 and it is this field intensity reduction which is sensed to actuate the remote bell unit 24 in house 10.

Figure 4A:
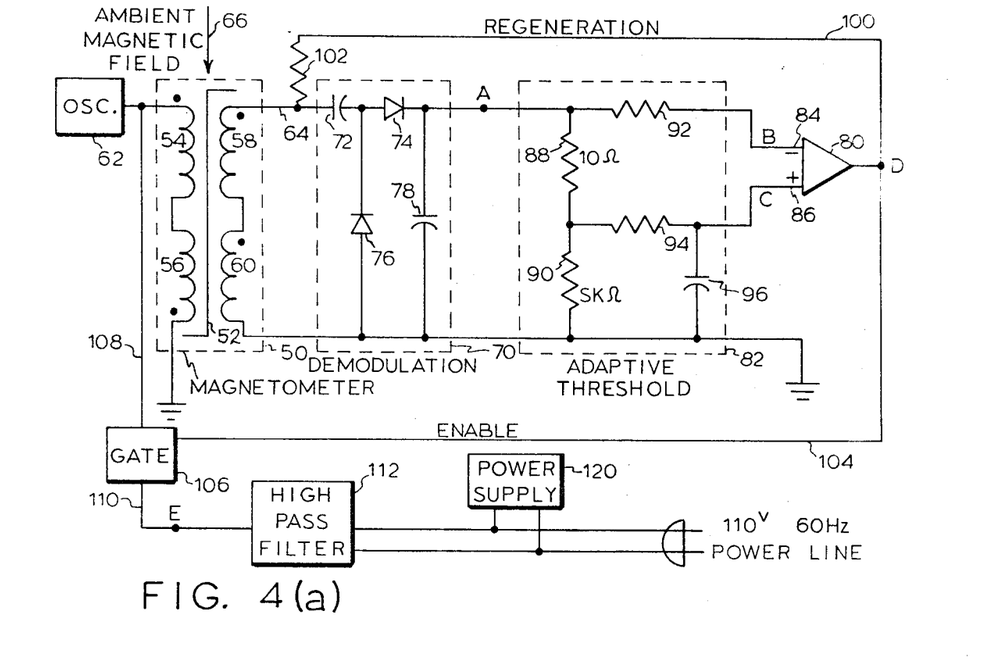
FIG. 4A is a schematic diagram of a preferred sensor unit embodiment in accordance with the present invention for sensing the entry of a vehicle into a specified area.

Attention is now called to FIG. 4A which illustrates a schematic diagram of a preferred embodiment of a vehicle sensor unit, e.g., 30, in accordance with the present invention. The embodiment of FIG. 4A preferably employs a flux gate magnetometer 50 as the magnetic field sensing device mounted so as to sense the substantially vertical magnetic field component. As is explained in detail in the afore-cited U.S. Pat. No. 3,249,915, a flux gate magnetometer 50 can be comprised of a magnetically saturable element 52 forming a core upon which a plurality of windings 54, 56, 58 and 60 are placed. The windings 54 and 56 comprise energizing windings and are wound on the core 52 with opposite orientations, as expressed by the orientation representing dots. As shown, the windings 54 and 56 are connected in series between the output terminal of an oscillator 62 and a source of reference potential, such as ground. The oscillator 62 provides a relatively high frequency alternating current output signal, e.g., at 100 kilohertz, to energize the windings 54 and 56.

The windings 58 and 60 comprise output windings and, as represented by the orientation dots, are wound on the core 50 with similar orientation dots, are wound on the core 50 with similar orientations. The windings 58 and 60 are connected in series between a source of reference potential, as ground, and a magnetometer output terminal 64.

As is explained in the cited U.S. Pat. No. 3,249,915 the flux gate magnetometer 50 will provide an output signal at terminal 64 having a frequency equal to twice that of the output of oscillator 62 and an amplitude substantially proportional to the net magnetic field intensity component, e.g., represented by arrow 66, through the sampling area thereof, essentially along core 52. The operation of the magnetometer 50 can be readily understood by initially considering its performance in the absence of any net external magnetic field component along the core 52. In this situation, during each half cycle of the energizing signal provided by oscillator 62, the windings 54 and 56 will produce opposite magnetic fields in the upper and lower (as represented in FIG. 4A) portions of core 52, respectively. The parameters of the magnetometer are selected such that saturation occurs within the core 52 for a major portion of each half cycle. Since the windings 54 and 56 are producing oppositely directed magnetic fields within the core 52 and since the output windings 58 and 60 are similarly wound, equal amplitude output signals of opposite polarity will be induced in the windings 58 and 60 by transformer action prior to saturation during each half cycle. As long as the signals induced in windings 58 and 60 are equal and of opposite polarity, they will, of course, cancel one another to provide essentially a zero amplitude output signal at magnetometer output terminal 64.

Now consider the action of the magnetometer in the presence of an ambient magnetic field as represented by the arrow 66. In this situation, during each half-cycle of the energizing signal, either the upper or lower section of the core 52 will saturate before the other section depending upon the direction of the ambient magnetic field. Thus, transformer action will continue for a longer portion of each half-cycle in one of the output windings 58 or 60, as compared to the duration of transformer action in the other output winding. As a consequence, the output windings 58 and 60 will yield an output signal at terminal 64 which has a frequency twice that of the frequency of the signal provided by the oscillator 62 and an amplitude substantially proportional to the magnitude of the magnetic field intensity component 66 along the core 52.

It is emphasized that although the disclosed flux gate magnetometer 50 constitutes a preferred form of magnetic field intensity sensing means, it is recognized that sensing devices other than the disclosed flux gate magnetometer could be suitably employed in accordance with the present invention.

Figure 4B:
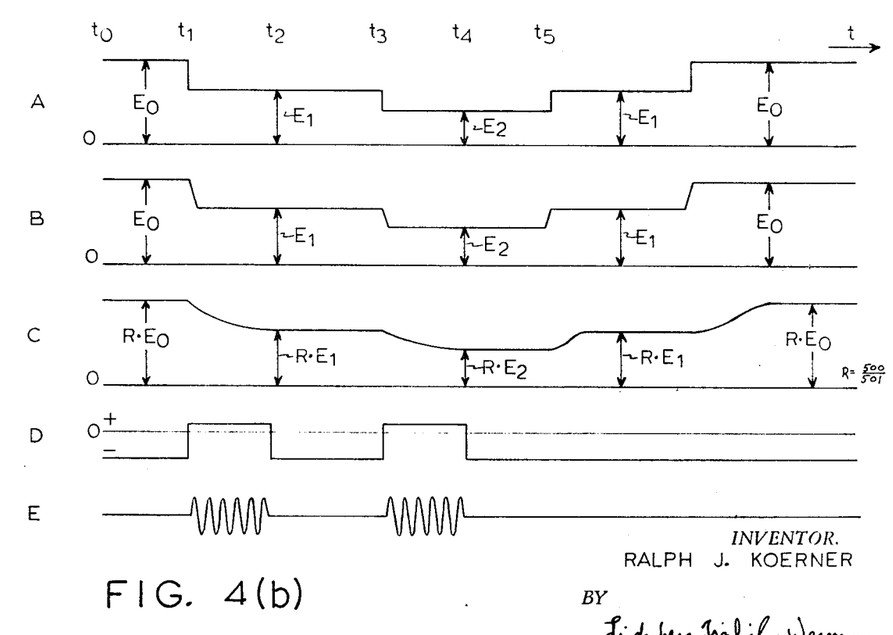
FIG. 4B is a diagram illustrating waveforms occuring at various points in the circuit of FIG. 4A.

The output signal provided on terminal 64 by the flux gate magnetometer 50 is coupled to a circuit 70 which will be referred to as a demodulation circuit. The demodulation circuit 70 responds to the alternating magnetometer output signal to provide a direct current signal at circuit point A having an amplitude substantially proportional to the external magnetic field intensity 66. The circuit 70 is comprised of a capacitor 72 and a diode 74 serially connected between magnetometer output terminal 64 and circuit point A. Diode 76 connects the junction between capacitor 72 and diode 74 to ground. Storage capacitor 78 connects circuit point A to ground. The two diodes 74 and 76 operate in conjunction with the capacitor 72 to provide voltage doubling and rectification. The capacitor 78 acts as a storage or integrating capacitor to yield a direct current potential at circuit point A substantially proportional to the intensity of the external magnetic field 66. As shown in FIG. 4B, it will be assumed that the direct current potential level established at circuit point A by the component of the ambient magnetic field along core 52 is equal to $E_0$.

As has been pointed out, in accordance with the present invention the magnetometer 50 is mounted so as to sense the substantially vertical field component adjacent to but outside of the projection of an area being monitored so that the entry of a magnetic permeable mass, i.e., a vehicle, into the monitored area, as was explained in conjunction with FIGS. 1, 2 and 3, will cause a reduction in the external magnetic field intensity through the magnetometer sampling area. As a consequence, the DC potential on circuit point A will fall from the level $E_0$ to a lower level, represented by $E_1$. That is, in the representative waveforms of FIG. 4B, the absence of a vehicle within either of the monitored areas 14W or 14E of FIGS. 2 and 3 has been assumed between times $T0$ and $T1$, however, it is assumed that a vehicle 40 enters one of the monitored areas, e.g., area 14W to thus reduce the external field intensity along saturable core 52 and in turn reduce the potential at circuit point A of FIG. 4A from the level $E_0$ to the level $E_1$ (FIG. 4B).

The reduction in potential at circuit point A caused by a vehicle entering a monitored service area is coupled to an amplifier 80 to generate a command signal to ultimately energize an audible alarm. Although the reduction in potential at circuit point A could be merely AC coupled in a conventional manner to the amplifier 80 by a capacitor and resistor, it has been found to be generally preferable to employ an adaptive threshold circuit, such as circuit 82 of FIG. 4A, to couple circuit point A to the amplifier 80. Briefly, the function of the adaptive threshold circuit 82 is to define a threshold signal level just slightly below, e.g., 0.2 percent, the level of the signal at circuit point A. When a magnetically permeable mass enters the area being monitored to reduce the level at circuit point A by more than 0.2 percent, this will trigger the amplifier 80 to generate a command output signal. After a short interval, e.g., 3 seconds, the threshold signal developed by the adaptive threshold circuit 82 will then adapt to the new level at circuit point A, so as to be able to thereafter recognize the entry of a subsequent magnetically permeable mass into the area being monitored.

More particularly, the adaptive threshold circuit 82 is comprised of a voltage divider including resistors 88 and 90 connected in series. In order to establish a threshold level substantially 0.2% below the level at circuit point A, the resistor 90 is selected to have a value approximately 500 times that of the resistor 88. Thus, resistor 88 can have an exemplary value of 10 K ohms and resistor 90 a value of 5 K ohms. A resistor 92, which may for example, be approximately 10 K ohms, couples circuit point A directly to amplifier input terminal 84. Resistor 94 which also may have a value on the order of 10 K ohms, couples the junction between resistors 88 and 90 to amplifier input terminal 86. A relatively large capacitor 96, for example having a value of 250 microfarads, connects amplifier input terminal 86 to ground.

Prior to considering the operation of the adaptive threshold circuit 82, it is pointed out that the amplifier 80 preferably comprises an operational amplifier, of which several satisfactory types are readily commercially available. The amplifier 80 is used such that when the potential on terminal 84 is more positive than the potential on terminal 86, the amplifier 80 will provide a negative output signal. On the other hand, when the potential on amplifier input terminal 86 is more positive than the potential on input terminal 84, then the amplifier 80 will provide a positive output signal.

Referring now to FIG. 4B, it will be noted that under ambient conditions in the absence of a vehicle within the monitored area, as represented between the times $t0$ and $t1$, the potential on amplifier input terminal 84, i.e., circuit point B, will be equal to $E_0$ or in other words the potential at circuit point A. At this time, the potential on amplifier input terminal 86 will be equal to $R \cdot E_0$ where R constitutes the ratio of the value of resistor 90 to the sum of the values of resistors 88 ad 90. Thus, utilizing the exemplary values shown in FIG. 4A, the potential at input terminal 86 (circuit point C) will be $500/501 \times E_0$. Accordingly, since the potential at input terminal 84 is more positive than the potential at input terminal 86, the amplifier 80 will provide a negative output signal at circuit point D as represented in FIG. 4B.

Now assume at time $t_1$ a vehicle enters the monitored service area 14W of FIGS. 2 and 3. The magnetometer 50 will immediately sense the resulting reduced magnetic field intensity and thus the potential at circuit point A will immediately fall from level $E_0$ to $E_1$. Since circuit point B is directly resistively coupled to circuit point A, the potential thereon will likewise rapidly fall from level $E_0$ to level $E_1$. On the other hand, because of the large time constant established by the large capacitor 96, the potential on input terminal 86 (circuit point C) will change considerably more slowly from the level $R \cdot E_0$ to the new level $R \cdot E$. This, of course, means that the potential on amplifier input terminal 86 will temporarily be more positive than the potential on input terminal 84 and as a consequence the output of amplifier 80 will go positive until the capacitor 96 discharges to where the potential on amplifier 86 is again less positive than the potential on input terminal 84. Thus, FIG. 4B represents that amplifier 80 will provide a positive output signal at circuit point D between times $t1$ and $t2$ which duration is primarily determined by the value of capacitor 96 and which is selected to be sufficiently long, e.g., 2 to 3 seconds, to assure that vehicles entering the monitored areas at very slow speeds will still be recognized. Once the output of amplifier 80 returns to a negative potential, the sensor unit of FIG. 4A is then again able to sense a further field intensity reduction as would be produced by the entry of a new vehicle into the monitored area. That is, it has been assumed that the vehicle 40 of FIG. 3 entered the monitored area 14W at time $t1$ illustrated in FIG. 4B. This vehicle was detected by the amplifier 80 providing a positive output signal between times t1 and t2. Now assume that a second vehicle enters the area 14E of FIG. 3 at time t3 while the first vehicle still occupies the area 14W. The entry of the second vehicle will again cause a reduction of the potential level at circuit point A of FIG. 4A to again reduce the potential at circuit point B below the potential at circuit point C. As a consequence, the amplifier 80 will again provide a positive output signal between times $t3$ and $t4$. When one of the vehicles leaves the monitored area at time t5, it will produce an increase in potential at circuit point A from level $E_2$ to level $E_1$, but however, it should be understood that this increase in potential will not activate the amplifier 80. This is, the increased potential on circuit point A will merely make the potential on input terminal 84 even more positive than it was relative to the potential on input terminal 86 and as a consequence the amplifier 80 will not respond.

Prior to considering the manner in which the output of amplifier 80 is utilized to supply a command signal to actuate an audible signal, i.e., the bell unit 24 in the service station house 10 (FIG. 1) it is pointed out that a regeneration path 100 can optionally be utilized to speed and make more positive the response of amplifier 80 to an arriving vehicle. More particularly, the output of amplifier 80 is coupled through a feedback resistor 102 to the magnetometer secondary windings 58 and 60 in a manner to further reduce the magnetic field along the saturable core 52. That is, as has been pointed out, the entry of a vehicle into the monitored area causes a reduction in the external magnetic field intensity along core 52 so as to cause the amplifier 80 to produce a positive output signal. The regeneration path 100 couples the output of the amplifier 80 back to the magnetometer output windings 58 and 60 with a sense such that a positive amplifier output produces a current through the output windings in a direction to produce a field component in core 52 opposite to the ambient magnetic field 86 to thereby further reduce the net magnetic field intensity along core 52 and thus increase the effect of an entering vehicle.

In accordance with a significant feature of the present invention for application in service stations and the like, the output signal provided by amplifier 80 is coupled back to the bell unit in the house 10 (FIG. 1) through a 110 volt power line which normally exists in most modern service stations. More particularly, the output of amplifier 80 is connected to the enable input terminal 104 of a gate 106. Additionally, the output of oscillator 62 is connected to the input terminal 108 of gate 106. The gate 106 functions to pass the signal applied to its input terminal 108 to its output terminal 110 when an enabling signal (herein assumed to be positive) is provided on its input terminal 104. The gate 106 can take many forms but most simply, it can constitute an operational amplifier, similar to the amplifier 80, which will pass the signal applied to input terminal 108 only when a positive potential is applied to the enable input terminal 104. FIG. 4B illustrates the signal supplied by gate 106 at its output terminal 110 (circuit point E) in response to the operation of the amplifier 80.

The output terminal 110 of gate 106 is coupled to the 110 volt power line which, as has been pointed out, normally extends to the service island in modern service stations. More particularly, the gate output terminal 110 is connected to the input of a high pass filter 112 whose output terminals 114 are connected to the 110 volt power line. Thus, as should now be readily appreciated, the entry of a permeable mass such as a vehicle into a monitored area such as either area 14E or 14W of FIGS. 2 and 3, causes amplifier 80 of FIG. 4A to produce a positive output signal to consequently couple a burst of the output signal of oscillator 62 to the 110 volt power line and thus to the bell unit 24 within the house 10.

Prior to terminating the discussion of FIG. 4A, it is pointed out that a conventional power supply unit 120 is incorporated in the vehicle sensor unit to provide the required potential levels to oscillator 62, amplifier 80, gate 106, etc.

Figure 5:
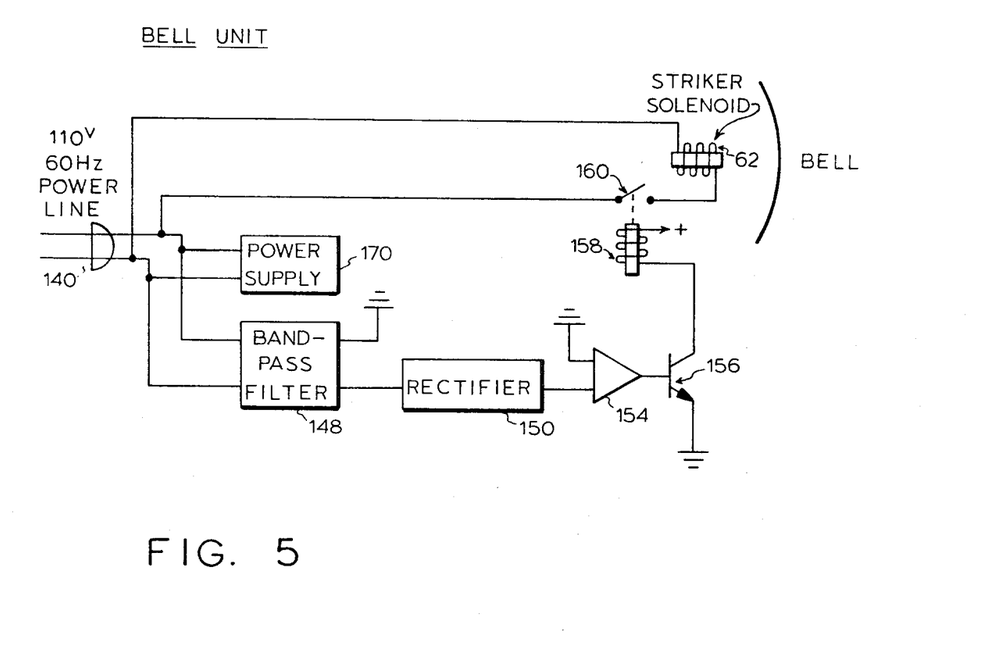
FIG. 5 is a schematic diagram of a bell unit in accordance with the present invention.

Attention is now called to FIG. 5 which schematically illustrates the circuitry of the bell unit 24 mounted within the service station house 10 (FIG. 1). It will be recognized that the function of the bell unit 24 is to monitor the 110 volt power line and respond to each high frequency burst thereon to energize the striker solenoid of a bell in order to audibly alert service station attendants.

The bell unit 24 of FIG. 5 is coupled to the 110 volt power line, as by plug 140. The plug 140 couples the power line to the input of a bandpass filter 148 which, of course, is selected to have a bandpass characteristic to pass signals within a small frequency band about a center frequency equal to the frequency of the output signal of oscillator 62. The output of the bandpass filter is coupled through rectifier 150 to power amplifier 154.

Although not illustrated, an appropriate noise discrimination circuit can be incorporated between filter 148 and amplifier 154 in order to distinguish the relatively long high frequency burst applied to the power line by the sensor unit from noise bursts which may spuriously appear on the power line in certain rare environments. In one simple form such a noise discrimination circuit could merely comprise a delay circuit selected so that it will suppress bursts supplied thereto which have a duration shorter than one-half second for example. It will be recalled that the burst supplied by the sensor unit will normally have a 2 to 3 second duration. Thus, to the extent that any spurrious 100 K Hz. signals appear on the power line, they will be suppressed unless they have a duration in excess of one-half second. Although the use of a simple delay circuit of this type is normally desirable and adequate in most environments to suppress spurrious noise, it is recognized that in other environments where, for some reason longer duration spurrious signals are likely to be frequently encountered, other and well known more complex and effective noise suppression and/or information coding circuits can be utilized.

In any event, it should be appreciated that noise suppression circuitry appropriate to a particular environment can be readily selected to distinguish the high frequency bursts supplied to the power line from gate 110 in order to activate power amplifier 154. The output of power amplifier 154 controls a switch 156, illustrated as an NPN transistor. More particularly, the output of amplifier 154 is connected to the base of transistor 156. The emitter of transistor 156 is connected to ground. The collector of transistor 156 is coupled through a coil of relay 158 to a source of positive potential. The relay coil 158 controls a normally open switch contact 160 which is connected in series with the coil of a striker solenoid 162. The coil of the striker solenoid 162 is connected across the 110 volt power line and in series with the normally open switch contact 160. Energization of the striker solenoid coil causes a striker (not shown) to strike a bell sounder 164 in order to generate the audible alert for the station attendant.

FIG. 5 also illustrates a power supply unit 170 powered from the 110 volt power line. The power supply unit 170 is utilized in order to generate the appropriate potential levels to power the amplifier 154, for example.

From the foregoing, it should now be appreciated that a vehicle detection system has been disclosed herein for responding to the entry of a permeable mass, such as a vehicle, into a specified area of the earth's surface. It will be recognized that the sensor unit of FIG. 4A has the capability of responding to the entry of successive vehicles as a consequence of the use of the adaptive threshold circuit 82 which effectively develops a threshold signal which adapts to any condition which exists for a certain length of time. It is as a consequence of the adaptive feature of FIG. 4A that the sensor unit is able to respond to a new vehicle arriving in the area 14E (FIG. 3), for example, even though the area 14W is still occupied by a vehicle to which the sensor unit has previously responded.

Although the utility of the adaptive feature of the sensor unit of FIG. 4A for many applications should be readily apparent, in other applications, it may be desirable to not only sense the entry of a vehicle into a monitored area, but in addition, to sense the continued presence of the vehicle in that area. In order to do this, a threshold level related to ambient field intensity is held substantially constant for long durations rather than adapting to relatively rapidly changing conditions such as is caused by an arriving vehicle. More particularly, in order to detect presence, the threshold is held constant at a level determined by the ambient conditions at the particular site at which a sensor unit is being employed.

Figure 6A:
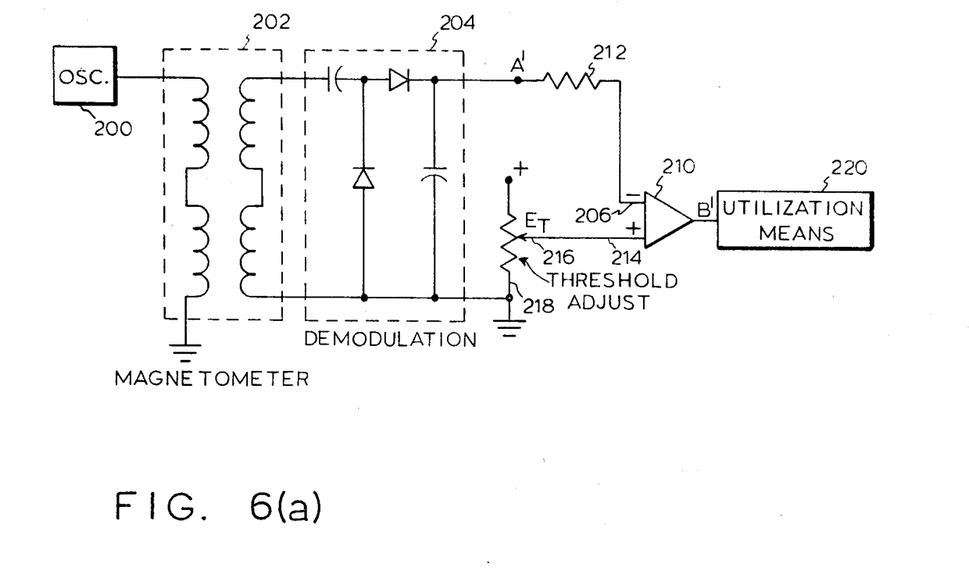
FIG. 6A is a schematic diagram of a sensor unit embodiment for detecting the presence of a vehicle within a specified area.
Figure 6B:
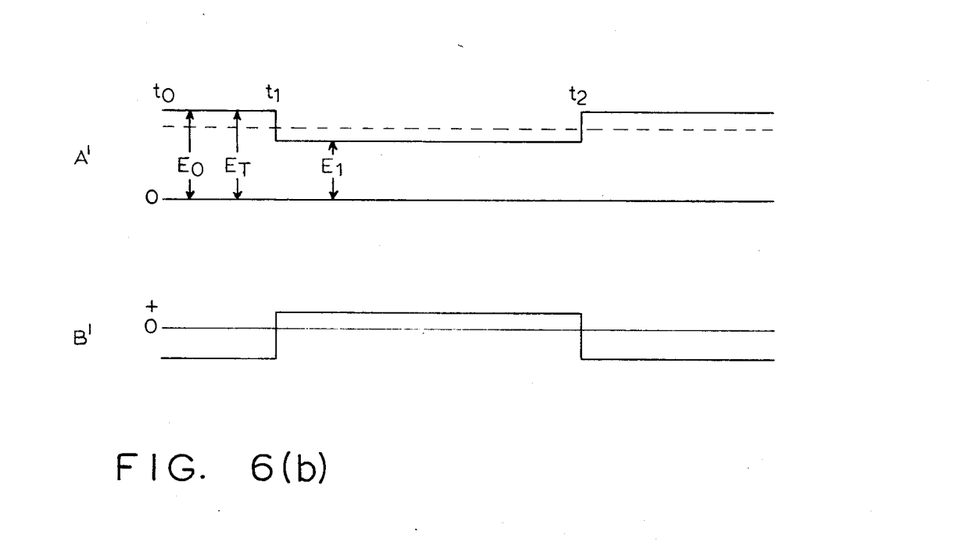
FIG. 6B is a diagram illustrating waveforms occurring at various points within the circuit of FIG. 6A.

FIG. 6A illustrates a vehicle sensor unit which not only responds to the entry of a vehicle into a monitored area, but in addition to its continued presence in the area. It will be recognized that from FIG. 6A, the circuit therein is quite similar to the circuit of FIG. 4A. That is, it employs a high frequency oscillator 200 for energizing a magnetometer 202. The output of the magnetometer is then applied through a demodulation circuit 204 to develop a direct current potential at circuit point A', the level of which is substantially proportional to the magnetic field intensity seen by the magnetometer 202. FIG. 6B illustrates the potential level at point A'. The time interval between time $t0$ and $t1$ assumes that the magnetometer 202 sees the ambient magnetic field in the absence of a vehicle and as a consequence of that field produces a potential level $E_0$ at circuit point A'. As shown in FIG. 6A, circuit point A' is coupled to the input terminal 206 of an amplifier 210 through a resistor 212. The second input terminal 214 of amplifier 210 is coupled to the slider 216 of a potentiometer 218. The potentiometer 218 is connected between a source of positive potential and ground. The output of the amplifier 210 is illustrated as being connected to a utilization means 220 which can, for example, constitute the gate 106 of FIG. 4A. Although the regeneration path 100 of FIG. 4A is not illustrated in FIG. 6A, it will be recognized that regeneration can advantageously be incorporated therein also.

In order to use the sensor unit of FIG. 6A, the position of the slider 216 on potentiometer 218 must first be established to produce the threshold level. To do this, under ambient conditions, in the absence of a vehicle within the monitored area, the slider 216 is manually adjusted to a level just below that which trips the utilization means 220. That is, the slider 216 is moved along the potentiometer to establish a threshold potential $E_t$ thereon which is very slightly more negative than the potential on input terminal 206 under ambient conditions in the absence of a vehicle. This can be physically done by increasing in the positive direction the value of $E_t$ until the utilization means 220 is tripped nd then backing off slightly so that the potential $E_t$ is established at a level just slightly below the potential $E_0$ established by the ambient magnetic field in the absence of a vehicle within the monitored area. This type of procedure is often referred to as a site adjustment and is normally performed only upon the initial installation of the sensor unit. Once the proper site adjustment has been found, the position of the slider 216 on the potentiometer 218 should be held fixed.

Whenever a vehicle arrives then into the area monitored by the magnetometer 202, the potential at circuit point A' will fall from the level $E_0$ to a level $E_1$ below the established threshold level $E_t$. As a consequence, the potential on amplifier input terminal 14 will become more positive than the potential on amplifier input terminal 206 and as a consequence the amplifier 210 will provide a positive output signal as shown in FIG. 6B, to thus actuate the utilization means 220.

From the foregoing, it will be recognized that an adaptive vehicle sensor unit has been shown herein in FIG. 4A to sense the entry of a vehicle into a specified area and to thereafter adapt to the presence of the recognized vehicle in order to enable it to sense the entry of a subsequent vehicle into the monitored area. On the other hand, the sensor unit of FIG. 6A is able to respond to the entry and continued presence of a vehicle within the monitored area. It should readily be recognized that in actuality the capabilities of the sensor unit of FIG. 4A and FIG. 6A could be combined within a single unit in order to enable it to selectively operate in either an adaptive mode analogous to the operation of the sensor unit of FIG. 4A or a presence mode analogous to the operation of the embodiment of FIG. 6A. Mode selection can, for example, be determined by the position of a manual switch on the sensor unit. It should further be recognized that either the sensor unit of FIG. 4A or 6A could be utilized to actuate a remote signal unit, such as the audible bell unit 24, as by coupling a high frequency signal through an existing power line. Although this manner of communication is particularly useful in service station applications, it should be recognized that other applications of the invention may not require remote communication. For example only, embodiments of the present invention can be utilized to signal the arrival of a vehicle adjacent a bank drive-in window. In this application, it is probable that the audible signal unit could be coupled directly to the sensor unit so that communication over the power line is not required. It other situations, as for example in conjunction with parking gates where the arrival of a vehicle adjacent a ticket dispensing machine is intended to raise a gate in front of the vehicle, a special communication conductor, might be utilized in lieu of the power line communication technique explained in conjunction with FIGS. 1–5.

Figure 7:
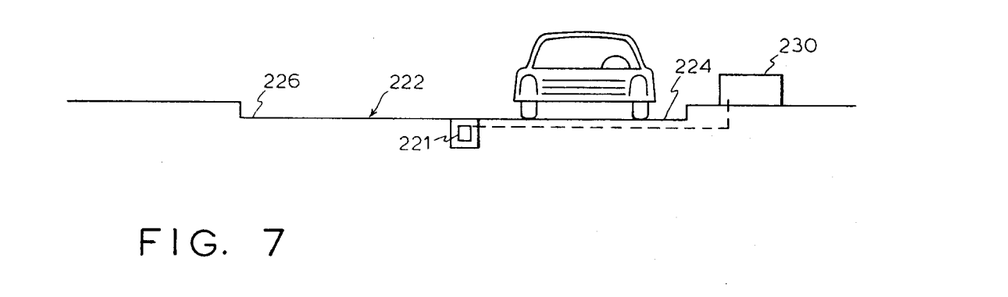
FIG. 7 is a diagram illustrating an alternate application of the present invention.

Although the embodiments of FIGS. 4A and 6A contemplate that the magnetic field intensity sensing device, i.e., the magnetometer, be contained within a housing also containing the illustrated electronics, it should further be recognized that the magnetometer alone could be utilized remote from the circuitry utilized therewith. Thus, FIG. 7 illustrates an embodiment of the invention in which a probe 221 containing a magnetometer is buried beneath the surface of a roadway 222. FIG. 7 illustrates the probe 221 as being buried between two adjacent lanes 224 and 226, rather than within the lane as is characteristic of the prior art. That is, the probe 221 of FIG. 7 should be buried substantially vertically adjacent to but outside of the substantially vertical projection of the lane or area being monitored in order to sense a reduction in field intensity caused by a magnetically permeable mass. Utilization of the probe 221 in the manner shown in FIG. 7 enables a single probe to monitor both lanes 224 and 226.

The circuitry required to function with the probe 221 can be contained within a roadside housing 230. Thus, for example, the housing 230 can contain the oscillator 200, the demodulation circuit 204, the amplifier 210 and accompanying circuitry, and the utilization means 220 of FIG. 6A.

Although several applications of the embodiments of the invention and variations thereof have been mentioned herein, it should be readily recognized that embodiments of the invention will find utility in many other applications wherein it is desired to sense the entry or presence of a magnetically permeable mass within an area of the earth's magnetic surface.

What is claimed is:

1. A system for monitoring a specified volume within a magnetic field to determine whether the volume contains a magnetically permeable mass, said system comprising:

magnetometer means for measuring magnetic field intensity through a sampling area thereof and for providing an output signal indicative of the level of said measured field intensity;

means supporting said magnetometer means adjacent to said volume with the sampling area thereof outside of the projection of said volume projected in the direction of said magnetic field;

means for providing a reference signal indicative of a threshold level of magnetic field intensity through said sampling area; and means responsive to said output signal indicating a reduction in magnetic field intensity through said sampling area below said threshold level for indicating said specified volume contains a magnetically permeable mass.

2. The system of claim 1 wherein said means for providing said reference signal includes means for varying said reference signal in response to variations in said output signal, said means for varying said reference signal including time delay means whereby variations in said reference signal will lag variations in said output signal.

3. The system of claim 1 including means for manually varying said reference signal.

4. The system of claim 1 wherein said output signal provided by said magnetometer means has an amplitude substantially proportional to magnetic field intensity through said sampling area.

5. The system of claim 4 wherein said means for providing said reference signal includes means for varying the amplitude of said reference signal in response to amplitude variations in said output signal, said means for varying including time delay means whereby said reference signal variations will lag the output signal variations to which they are responsive.

6. The system of claim 4 including means for manually varying the amplitude of said reference signal.

7. A system for detecting the entry of a magnetically permeable mass into a volume constituting a projection of a specified area of the earth's surface projected in the direction of the magnetic field thereat and for indicating such entry at a location remote therefrom, said system comprising:

a sensor unit defining a sampling area disposed proximate to said volume outside of the projection of said specified area;

an indicating unit disposed remote from said volume; and electrical conductor means coupling said sensor unit and indicating unit;

said sensor unit including;

a magnetic field intensity measuring means for providing an output signal indicating the magnetic field intensity through a sampling area defined thereby; and means responsive to a variation in said output signal indicating a reduction in magnetic field intensity through said sampling area for coupling a command signal to said electrical conductor means;

said indicating unit including means responsive to said command signal for indicating the entry of a magnetically permeable mass into said volume.

8. The system of claim 7 wherein said electrical conductor means comprises a conventional power line coupled to an alternating current source providing electrical power at a frequency $F_1$; and wherein said means responsive to said output signal includes oscillator means for providing said command signal at a frequency $F_2$ where $F_2$ has a value different from $F_1$.

9. The system of claim 8 including:

first power supply means in said sensor unit responsive to said electrical power at a frequency $F_1$ for energizing said oscillator means; and second power supply means in said indicating unit responsive to said electrical power at a frequency $F_1$ for energizing said means responsive to said command signal.

10. The system of claim 9 wherein said sensing means comprises a magnetometer having an input winding; and means coupling the output of said oscillator means to said magnetometer input winding.

11. The system of claim 7 wherein said means responsive to a variation in said output signal includes:

means for providing a reference signal indicative of a threshold level of magnetic field intensity through said sampling areas; and means for comparing said reference and output signals.

12. The system of claim 11 wherein said means for providing said reference signal includes means for varying said reference signal in response to variations in said output signal, said means for varying said reference signal including time delay means whereby variations in said reference signal lag variations in said output signal.

13. A vehicle detection system, useful in service stations and the like having a common conductor extending between a service area and a remote area, for indicating at said remote area the entry of a vehicle into said service area, said system comprising:
- a magnetic field sensing means for providing an output signal having an amplitude substantially proportional to magnetic field intensity through a sampling area defined thereby;
- means supporting said sensing means proximate to said service area with the sampling area of said sensing means being outside of the volume formed by projecting said service area in the direction of the magnetic field thereat; and
- means responsive to a reduction in amplitude of said output signal for indicating at said remote area the entry of a vehicle into said service area.

14. The system of claim 13 wherein said means responsive to a reduction in amplitude of said output signal includes means for providing a reference signal having an amplitude representative of a threshold magnetic field intensity level through said sampling area; and
- means for comparing the amplitudes of said output and reference signals.

15. The system of claim 14 including means for varying the amplitude of said reference signal in response to amplitude variations in said output signal, said means for varying including time delay means whereby said reference signal variations will lag the output signal variations to which they are responsive.

16. The system of claim 13 including oscillator means providing a signal at frequency $F_2$; and wherein
- said means responsive to a reduction in amplitude of said output signal includes means for coupling said oscillator means signal to said common conductor, and means at said remote location connected to said common conductor and responsive to a signal at frequency $F_2$.

17. The system of claim 16 wherein said common conductor means comprises a conventional power line coupled to a source of alternating current at frequency $F_1$ where $F_2$ has a value different from $F_1$.

18. Vehicle detection apparatus comprising:
- magnetometer means for providing an output signal indicative of magnetic field intensity through a sampling area defined thereby;
- means providing a reference signal equivalent to a threshold level of magnetic field intensity through said sampling area;
- utilization means; and
- means for comparing said output and reference signals for enabling said utilization means when said output signal indicates the magnetic field intensity through said sampling area is less than said threshold level.

19. The apparatus of claim 18 including means for varying said reference signal in response to variations in said output signal, said means for varying including time delay means whereby variations in said reference signal lag variations in said output signal to which they are responsive.

20. The apparatus of claim 18 wherein said magnetometer means includes an input winding;
- oscillator means providing a signal at frequency $F_2$; and
- means coupling said oscillator means signal to said magnetometer input winding.

21. The apparatus of claim 20 wherein said means for comparing includes means for coupling said oscillator means signal to said utilization means when said magnetic field intensity through said sampling area is less than said threshold level.

22. A method of detecting and indicating the entry of a magnetically permeable mass into a volume constituting a specified area of the earth's surface projected in the direction of the magnetic field thereat, said method including the steps of;
- monitoring magnetic field intensity immediately adjacent to but outside of said projection of said specified area; and
- providing an entry indication when said monitored magnetic field intensity falls below a threshold level.

23. A method for indicating the entry of a magnetically permeable mass into a volume constituting a specified area of the earth's surface projected in the direction of the magnetic field thereat, said method including the steps of:
- generating a threshold signal representing the magnetic field intensity through a sampling area immediately adjacent to but outside of said projection of said specified area;
- monitoring the magnetic field intensity through said sampling area; and
- providing an entry indication when said monitored magnetic field intensity falls below the field intensity represented by said threshold signal.

24. The method of claim 23 including the step of varying said threshold signal in response to variations in magnetic field intensity through said sampling area.

* * * * *